United States Patent [19]

Nakayama et al.

[11] Patent Number: 4,892,789
[45] Date of Patent: * Jan. 9, 1990

[54] MAGNETIC RECORDING MEDIUM

[75] Inventors: Masatoshi Nakayama; Yasufumi Takasugi; Kunihiro Ueda, all of Tokyo, Japan

[73] Assignee: TDK Corporation, Tokyo, Japan

[*] Notice: The portion of the term of this patent subsequent to Jun. 7, 2005 has been disclaimed.

[21] Appl. No.: 812,897

[22] Filed: Dec. 23, 1985

[30] Foreign Application Priority Data

Dec. 25, 1984 [JP] Japan ................... 59-279748

[51] Int. Cl.$^4$ .................................. G11B 5/64
[52] U.S. Cl. ........................ 428/336; 427/44; 428/694; 428/900
[58] Field of Search ............ 428/694, 336, 900; 427/44, 129

[56] References Cited

U.S. PATENT DOCUMENTS

| 4,419,404 | 12/1983 | Arai et al. | 427/44 |
| 4,429,024 | 1/1984 | Meno | 427/128 |
| 4,521,482 | 6/1985 | Arai | 427/131 |
| 4,565,734 | 1/1986 | Arai | 428/422 |
| 4,582,746 | 4/1986 | Shirahata | 428/336 |
| 4,599,266 | 7/1986 | Nakayama | 428/694 |
| 4,601,950 | 7/1986 | Iida | 428/695 |
| 4,636,435 | 1/1987 | Yanagihara | 428/336 |

FOREIGN PATENT DOCUMENTS

| 53-88704 | 4/1978 | Japan . |
| 57-135443 | 8/1982 | Japan . |
| 57-198541 | 12/1982 | Japan . |
| 57-198542 | 12/1982 | Japan . |
| 58-102330 | 6/1983 | Japan . |
| 58-194131 | 11/1983 | Japan . |
| 59-119536 | 7/1984 | Japan . |
| 59-119537 | 7/1984 | Japan . |
| 59-119538 | 7/1984 | Japan . |
| 0121520 | 6/1985 | Japan ................ 428/695 |
| 2103957 | 3/1983 | United Kingdom . |

OTHER PUBLICATIONS

Patents Abstracts of Japan, P-332, Feb. 5, 1985, vol. 9, No. 26, 59-171028.
Patents Abstracts of Japan, P-326, Jan. 11, 1985, vol. 9, No. 6, 59-154641.

Primary Examiner—Paul J. Thibodeau
Attorney, Agent, or Firm—Oblon, Spivak, McClelland, Maier & Neustadt

[57] ABSTRACT

In a magnetic recording medium comprising a substrate, a ferromagnetic metal thin film formed on the substrate, and a topcoat formed on the thin film, the topcoat comprises a plasma-polymerized film containing carbon and hydrogen with the atomic ratio of carbon to hydrogen being from 1 to 6, and an organic material film deposited on the plasma-polymerized film by evaporation.

4 Claims, 1 Drawing Sheet

F I G. 1
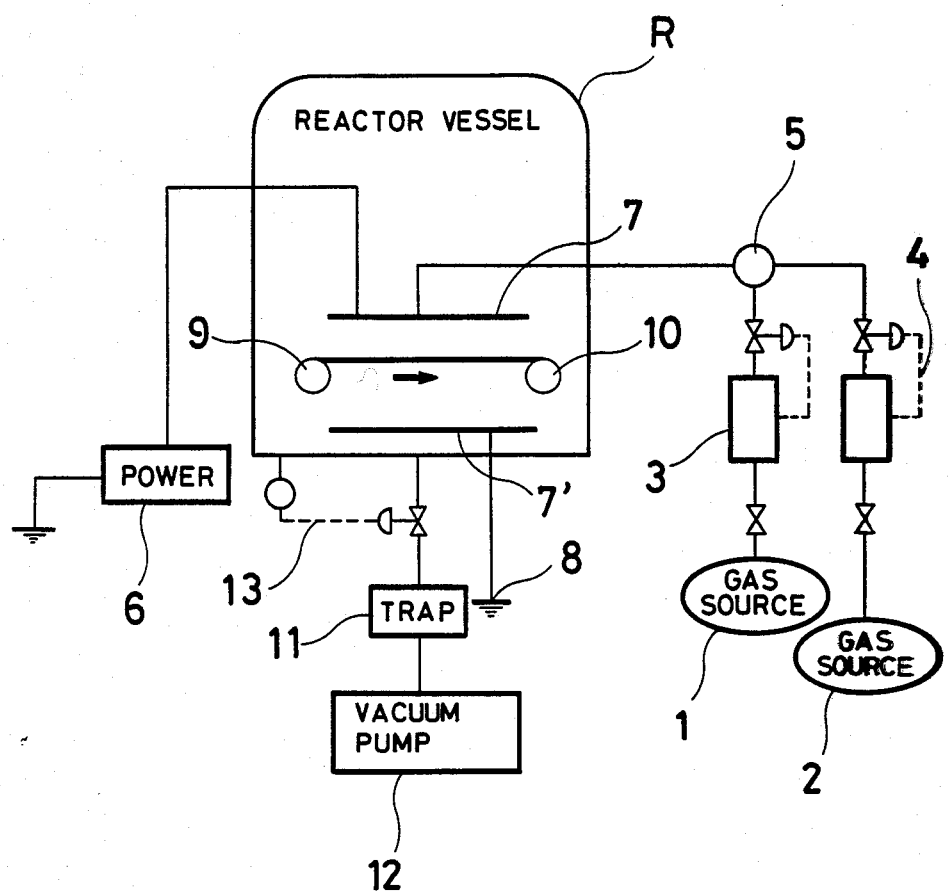

MAGNETIC RECORDING MEDIUM

BACKGROUND OF THE INVENTION

This invention relates to magnetic recording media, and more particularly, to improvements in magnetic recording media having a magnetic layer of the continuous thin film type.

Among magnetic recording media for use in video, audio and other applications, active research and development work has been made on magnetic recording media, usually magnetic tapes having a magnetic layer in the form of a continuous thin film because of the compactness of a roll of tape.

The preferred magnetic layers for such continuous film type media are deposited films of Co, Co-Ni, Co-O, Co-Ni-O and similar systems formed by the so-called oblique incidence evaporation process in which cobalt and optional elements are evaporated and directed at a given angle with respect to the normal to the substrate because such evaporated films exhibit superior characteristics. The evaporated magnetic layers, however, have many disadvantages including high dynamic friction, low film strength, rough head contact, and low runnability (that is, the durability of tape which travels in frictional contact with rigid members in a video equipment) resulting in reduced output after repeated travels. In the case of video application, the evaporated magnetic layers exhibit a short life time when operated in the still mode (to be simply referred to as "still life", hereinafter). In addition, there occur many dropouts in such layers.

Under these circumstances, a variety of topcoats have heretofore been proposed which cover obliquely evaporated magnetic layers. Exemplary of the topcoat are a variety of plasma-polymerized films as disclosed in Japanese Patent Application Kokai Nos. 58-194131, 57-135442, 57-135443, 57-198542 and 58-102330, and a variety of vapor deposited and coated films as disclosed in Japanese Patent Application Kokai Nos. 53-88704 and 53-93533 and Japanese Patent Aoplication Nos. 57-234816 and 57-234817. However, these topcoats formed by the conventional methods are not fully satisfactory, exhibiting insufficient corrosion resistance and low runnability at a low temperature.

SUMMARY OF THE INVENTION

It is an object of the present invention to provide an improved magnetic recording medium having high corrosion resistance and runnability at a low temperature.

The present invention is directed to a magnetic recording medium comprising a substrate, a ferromagnetic metal thin film formed on the substrate, and a topcoat formed on the thin film. According to the present invention, the topcoat comprises a plasma-polymerized film containing carbon and hydrogen with the atomic ratio of carbon to hydrogen being from 1 to 6, and an organic material film vacuum deposited on the plasma-polymerized film.

BRIEF DESCRIPTION OF THE DRAWING

The figure is a schematic view of a plasma polymerizing apparatus.

DETAILED DESCRIPTION OF THE INVENTION

The topcoat in the magnetic recording medium of the present invention includes a first layer of a plasma-polymerized film, which is a thin film containing carbon and hydrogen.

The film containing these elements can be plasma polymerized using gaseous hydrocarbons at room temperature because of ease of operation. Exemplary of the gaseous hydrocarbons there may be given saturated and unsaturated hydrocarbons, for example, methane, ethane, propane, butane, pentane, ethylene, propylene, butene, butadiene, acetylene, methylacetylene, and the like, and mixtures thereof. If desired, a hydrocarbon which is liquid at room temperature may be used as the source material for plasma polymerization. The source material may optionally contain a minor proportion of nitrogen, oxygen, boron, phosphorus, etc.

The thus formed plasma-polymerized film contains carbon and hydrogen in an atomic ratio of carbon to hydrogen (C/H) in the range of from 1:1 to 6:1. A plasma-polymerized film having such a C/H ratio exhibits outstandingly improved corrosion resistance and durability. C/H ratios less than 1 provide films practically unacceptable in corrosion resistance, durability and strength. A substantial reduction in output occurs after repeated cycles at C/H ratios higher than 6.

It should be noted that the C/H ratio may be determined by SIMS (secondary ion mass spectroscopy), for example. When SIMS is used, the C/H ratio of the present topcoat film having a thickness of 10 to 40 Å may be calculated by determining the counts of C and H at the topcoat film surface. Alternatively, the C/H ratio may be calculated by determining the profile of C and H while effecting ion etching with Ar or the like. The measurement of SIMS may be in accord with the article "SIMS and LAMMA" in the Surface Science Basic Lectures, Vol. 3, 1984, Elementary and Application of Surface Analysis, page 70.

The first layer of plasma-polymerized film has a thickness of 10 to 40 Å, preferably 15 to 30 Å. In magnetic recording media of the continuous thin film type, when a plasma-polymerized film has a thickness in excess of 40 Å, the spacing loss (magnetic loss due to thickness component) becomes too much and the magnetic flux density is lowered. Thicknesses less than 10 Å are too thin to provide any noticeable improvement in corrosion resistance and runnability and result in degraded film rupture strength.

Control of film thickness in forming a plasma-polymerized film may be readily done by controlling reaction time, web moving speed, source gas flow rate and other factors. Control should be done so as to produce a magnetic recording medium having a reduced spacing loss, and high corrosion resistance, runnability, and film rupture strength.

The thus prepared plasma-polymerized film should have a contact angle with water in the range from 60° to 120°. Plasma-polymerized films having a contact angle of smaller than 60° are practically unacceptable in durability and corrosion resistance. Plasma-polymerized films having a contact angle of greater than 120° are difficult to produce from a hydrocarbon and unnecessary for actual applications.

Preferably, the plasma polymerized film is prepared by feeding a gaseous reactant into a plasma zone with W/F.M set to $10^7$ to $10^{12}$ joule/kg wherein W is an input power applied for plasma generation as expressed in joule/sec., F is a flow rate of the gas reactant as expressed in kg/sec., and M is the molecular weight of the gas reactant. If W/F·M is less than $10^7$, the resulting plasma-polymerized film is insufficiently dense. If W/F·M exceeds $10^{12}$, the underlying magnetic layer or web is too adversely affected.

When more than one source gas is used, the flow rate F and molecular weight M used in the calculation of W/F·M are combined flow rate and molecular weight of the gases.

The plasma-polymerized film is prepared by using the above-mentioned hydrocarbon as a source gas, creating a discharge plasma of the gas, and contacting the plasma with the magnetic layer;

The principle of plasma polymerization will be briefly described. When an electric field is applied to a gas kept at a reduced pressure, free electrons which are present in a minor proportion in the gas and have a remarkably greater inter-molecular distance than under atmospheric pressure are accelerated under the electric field to gain akkinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into a highly ionized state. This is generally called a plasma. Since gaseous molecules have a less chance of collision with electrons and little absorb energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of chemical reaction such as polymerization while being kept relatively unchanged from the original. The present invention utilizes this state to form a plasma-polymerized film on a magnetic layer. The low temperature plasma has no adverse effect on the base film and the magnetic layer.

The figure illustrates a typical apparatus in which a plasma-polymerized film is formed on the surface of a magnetic layer. This plasma apparatus uses a variable frequency power source. The apparatus comprises a reactor vessel R into which reactant gases are introduced from sources 1 and 2 through mass flow controller 3 and 4, respectively. A single gas may be fed from a single source. When it is desired to use different gases from the sources 1 and 2, they are mixed in a mixer 5 before hey are introduced into the vessel. The source gases may be fed at a flow rate of 1 to 250 ml per minute.

Disposed in the reactor vessel R is means for supporting the base web having a magnetic layer thereon, in this embodiment, a set of supply and take-to rolls 9 and 10 on which the web is wound. Depending on the particular shape of the magnetic recording medium base web, any desired supporting means may be used, for example, a rotary support apparatus on which rests the base film having magnetic layer to be treated.

On the opposed sides of the web are located a pair of electrodes 7 and 7', one electrode 7 being connected to a variable frequency power source 6 and the other electrode 7' being grounded at 8.

The reactor vessel R is further connected to a vacuum system for evacuating the vessel, including a liquefied nitrogen trap 11, a vacuum pump 12, and a vacuum controller 13. The vacuum system has the capacity of evacuating and keeping the reactor vessel R at a vacuum of 0.01 to 10 Torr.

In operation, the reactor vessel R is first evacuated by means of the vacuum pump 12 to a vacuum of $10^{-3}$ Torr or lower before a source gas or gases are fed into the vessel at a given flow rate. Then the interior of the reactor vessel is maintained at a vacuum of 0.01 to 10 Torr. A take-up roll motor (not shown) is turned on to transfer the web. When the speed of transfer of the web and the flow rate of the gas mixture become constant, the variable frequency power 6 is turned on to generate a plasma with which a plasma-polymerized film is formed on the magnetic layer provided on the travelling web.

The remaining parameters such as applied current and treating time may be as usual and properly chosen without undue experimentation.

Plasma generation may be conducted by another means such as microwave discharge, direct current discharge, and AC discharge in addition to the above-mentioned high frequency discharge.

On the thus prepared plasma polymerized film, an organic material film is further provided by vapor deposition.

The organic material deposited film is preferably formed of a fatty acid, a fatty acid ester, a phosphoric ester and a salt thereof, alone or in admixture thereof.

Preferred fatty acids are saturated fatty acids having at least 12 carbon atoms, most preferably 13 to 21 carbon atoms, such as caprylic acid, capric acid, lauric acid, myristic acid, palmitic acid, stearic acid, behenic acid, oleic acid, elaidic acid, linolic acid, linolenic acid and stearolic acid.

Preferred fatty acid esters are esters of monobasic fatty acids having 12 to 16 carbon atoms with monohydric alcohols having 3 to 12 carbon atoms, and esters of monobasic fatty acids having 17 or more carbon atoms with monovalent alcohols in which the total number of carbon atoms is in the range from 21 to 23.

The phosphoric esters may be any of mono-, di- and tri-esters. The esterifying portion may be an optionally substituted, alkyl group, aryl group, alkaryl group, or alcohol group preferably having 10 to 22 carbon atoms. Di or tri-esters preferably have 44 or less carbon atoms in total.

Mono- or di-esters of phosphoric acid can form salts with an alkali metal, alkaline earth metal or ammonium. A typical example of the phosphate is cetyl phosphate.

The organic material deposited film has a thickness of 5 to 100 Å, preferably 10 to 60 Å. Thicknesses of less than 5 Å fail to fully reduce dynamic fraction, whereas thicknesses in excess of 100 Å frequently causes clogging of the head gap, both being unacceptable for practical use. The overall thickness of the topcoat including the plasma-polymerized and vacuum-deposited films is about 20 to 100 Å.

Deposition of the organic materials may be conducted under such conditions as employed in a common vapor deposition process.

The thus prepared topcoat film should have a contact angle with water in the range from 60° to 110°. Topcoat films having a contact angle of smaller than 60° are less preferred because of increased dynamic friction.

The magnetic layer is of continuous ferromagnetic metal thin film type coextending over the substrate and is generally based on cobalt. In preferred embodiments of the present invention, the magnetic layer may preferably consist essentially of cobalt; cobalt and oxygen; cobalt, oxygen and nickel and/or chromium. That is, the magnetic layer may consist essentially of cobalt alone or a mixture of cobalt with nickel and/or oxygen.

Where the layer consists essentially of cobalt and nickel, the weight ratio of Co/Ni may preferably be at least about 1.5.

The magnetic layer may further contain oxygen in addition to cobalt or cobalt and nickel. The presence of oxygen contributes to further improvements in electromagnetic characteristics and runnability. In this case, the atomic ratio of O/Co (when nickel free) or O/(Co+Ni) is preferably not more than about 0.5, and more preferably from about 0.05 to 0.5.

Better results are obtained when the ferromagnetic metal thin film layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. In this case, the weight ratio of Cr/Co (when nickel free) or Cr/(Co+Ni) is preferably in the range of about 0.001 to 0.1, and more preferably about 0.005 to 0.05.

On the surface of the ferromagnetic metal thin film layer, oxygen forms oxides with ferromagnetic metals Co and Ni. In Auger spectroscopy, peaks indicative of oxides appear in a surface layer, particularly in a surface layer from the surface to a depth of 50 to 500 Å, more preferably 50 to 200 Å. This oxide layer has an oxygen content of the order of 0.5 to 1.0 in atomic ratio. No particular limit is imposed on the concentration gradient of oxygen in the ferromagnetic metal thin film layer.

The ferromagnetic metal thin film layer may further contain trace elements, particularly transition metal elements, for example, Fe, Mn, V, Zr, Nb, Ta, Ti, Zn, Mo, W, Cu, etc.

The ferromagnetic metal thin film layer preferably consists of a coalescence of Co base particles of columnar structure oriented oblique to the normal to the substrate. More specifically, the axis of particles of columnar structure is preferably oriented of about 10 to 70 degrees with respect to the normal to the major surface of the substrate. Each columnar particle generally extends throughout the thickness of the thin film layer and has a minor diameter of the order of 50 to 500 angstroms. Cobalt and optional metals such as nickel and chromium form the columnar structure particles themselves while oxygen, when added, is generally present on the surface of each columnar structure particle in the surface layer essentially in the form of oxides. The ferromagnetic metal thin film layer generally has a thickness of about 0.05 to 0.5 $\mu$m, and preferably about 0.07 to 0.3 $\mu$m.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process, reference should be made to D. E. Speliotis et al., "Hard magnetic films of iron, cobalt and nickel", *J. Appl. Phys.*, 36, 3,972 (1965) and Y. Maezawa et al., "Metal thin film video tape by vacuum deposition", IERE Conference Proceedings 6 (The Fourth International Conference on Video and Data Recording, The University of Southanmpton, Hampshire, England, 20–23 April, 1982), pp. 1–9.

The substrate on which the ferromagnetic metal thin film layer is formed is not particularly limited as long as it is non-magnetic. Preferably, the substrate is flexible and more preferably of such a resin as polyesters and polyimides. The thickness of the substrate may vary over a wide range and generally ranges from about 5 to 20 $\mu$m. The substrate may be provided with any well-known backcoat layer on the back surface thereof opposite to the ferromagnetic layer-bearing surface.

The ferromagnetic metal thin film layer may be formed on the substrate either directly or via an undercoat layer of the well-known type. Further, the ferromagnetic metal thin film layer is generally formed as a single layer, but in some cases, it may be made up from a plurality of laminated sub-layers with or without an intermediate non-ferromagnetic metal thin film layer interposed therebetween.

The ferromagnetic metal thin film layer may be formed by any well-known techniques including evaporation, ion plating, and metallizing, and more preferably by the so-called oblique incidence evaporation process. The oblique incidence evaporation process may be any of well-known techniques preferably using an electron beam gun while the minimum incident angle with respect to the normal to the substrate is preferably at least 20 degrees. Incident angles of less than 20 degrees result in deteriorated electromagnetic properties. The evaporation atmosphere may generally be an inner atmosphere of argon, helium or vacuum containing oxygen gas at a pressure of about $10^{-5}$ to $10^0$ Pa. Those skilled in the art will readily select other evaporation parameters including source-substrate spacing, substrate feed direction, can and mask configurations and arrangement, and the like, through a simple experiment if necessary.

Evaporation in an oxygen-containing atmosphere causes a metal oxide film to form on the surface of the resulting magnetic layer. The partial pressure of oxygen gas necessary to allow for oxide formation may be readily determined through a simple experiment.

A metal oxide coating may be formed on the surface of the magnetic layer by an oxidizing treatment. Any of the following oxidizing treatments may be employed for this purpose.

(1) Dry treatment (a) Energy particle treatment

Oxygen may be directed as energy particles to the magnetic layer at the final stage of evaporation process by means of an ion gun or neutron gun as described in Japanese Patent Application No. 58-76640.

(b) Glow treatment

The magnetic layer is exposed to a plasma which is created by generating a glow discharge in an atmosphere containing $O_2$, $H_2O$ or $O_2+H_2O$ in combination with an inert gas such as Ar and $N_2$.

(c) Oxidizing gas

An oxidizing gas such as ozone and heated steam is blown to the magnetic layer.

(d) Heat treatment

Oxidation is effected by heating at temperatures of about 60 to 150° C.

(2) Wet Treatment (a) Anodization (b) Alkali treatment (c) Acid treatment Chromate treatment, permanganate treatment, phosphate treatment (d) Oxidant treatment $H_2O_2$

BENEFITS OF THE INVENTION

According to the present invention, there is formed on a magnetic layer in the form of a ferromagnetic metal thin film a topcoat consisting of a plasma-polymerized film of a specific composition and a topcoat of a given organic material film vapor deposited on the plasma-polymerized film. The resulting magnetic recording medium has high corrosion resistance and reduced dynamic friction, with improved runnability at low temperatures.

EXAMPLE

Example of the present invention is given below by way of illustration and not by way of limitation.

EXAMPLE 1

A polyethylene terephthalate (PET) web of 10 μm thick was moved along a cooling can in a vacuum vessel where a Co-Ni alloy was heated and evaporated by means of an electron beam gun while introducing oxygen. The Co-Ni alloy was vacuum deposited on the PET web. The background pressure in the vessel was set to $5 \times 10^{-5}$ Torr and the pressure was changed to $2 \times 10^{-4}$ Torr after introduction of $O_2$. The incident angle of deposition was continuously decreased from 90° to 30°. The deposited film had a composition of Co 80-Ni 20 on a weight basis and a thickness of about 1500 Å.

The magnetic layer-bearing web was then introduced into another vacuum chamber which was once evacuated to a vacuum of $10^{-3}$ Torr and then charged with $CH_4$ as a gaseous hydrocarbon and Ar as a carrier gas in a volume ratio of 10:1. A plasma was generated in the gas under a gas pressure of 0.05 Torr by applying a high frequency voltage at 13.56 MHz and 1 kW. W/F·M was calculated to be $7 \times 10^{10}$. A plasma-polymerized film was formed on the magnetic layer in this manner. The thus obtained plasma-polymerized film had a thickness of 15 Å and a C/H ratio of 2.5 as measured by SIMS.

On the plasma-polymerized film was formed a film as shown in Table I by vacuum deposition.

In this way, a series of topcoat layers were formed on the magnetic layers as shown in Table I.

The samples were measured for various properties as shown below.

Dynamic friction

Coefficient of friction of sample tape was determined at 5° C. and a relative humidity of 10%.

Corrosion resistance

A tape was measured for magnetic flux quantity both at the initial and after it was allowed to stand for 5 days at 60° C. and a relative humidity of 89%. A percent reduction in magnetic flux quantity ($\Delta\phi m/\phi m$, %) per square meter was determined.

Output reduction

A commercial VHS video deck was loaded and operated with a tape at 5° C. Using a signal of 4 Mhz, a reduction (dB) in output after 20 passes was determined.

TABLE I

| Sample No. | Plasma polymerized film | | | |
|---|---|---|---|---|
| | Source | W/F·M (Joule/kg) | Thickness (Å) | C/H |
| 1 | $CH_4$ | $7 \times 10^{10}$ | 15 | 2.5 |
| 2 | $CH_4$ | $7 \times 10^{10}$ | 25 | 2.5 |
| 3 | $CH_4$ | $7 \times 10^{10}$ | 30 | 2.5 |
| 4 | $CH_4$ | $7 \times 10^{10}$ | 100 | 2.5 |
| 5 | $CH_4$ | $8 \times 10^{12}$ | 5 | 4.5 |
| 6 | $C_2H_6$ | $7 \times 10^{10}$ | 20 | 3.0 |
| 7 | $C_3H_8$ | $7 \times 10^{10}$ | 30 | 3.5 |
| 8 | $CH_4$ | $9 \times 10^{11}$ | 20 | 8.0 |
| 9 | $CH_4$ | $6 \times 10^{8}$ | 20 | 0.8 |
| 10 | $CH_4$ | $9 \times 10^{9}$ | 20 | 8.0 |
| 11* | — | — | — | — |
| 12** | $CH_4$ | $7 \times 10^{10}$ | 25 | 2.5 |
| 13*** | — | — | — | — |

| Sample No. | Vapor deposited film | | Friction coefficient μ | $\Delta\phi m/\phi m$ (%) | Output reduction (dB) |
|---|---|---|---|---|---|
| | Source | Thickness (Å) | | | |
| 1 | $C_{15}H_{31}COOH$ | 20 | 0.25 | 10 | −1.0 |
| 2 | $C_{15}H_{31}COOH$ | 20 | 0.25 | 7 | −0.5 |
| 3 | $C_{17}H_{35}COOH$ | 20 | 0.25 | 9 | −1.0 |
| 4 | $C_{15}H_{31}COOH$ | 40 | 0.23 | 6 | −3.5 |
| 5 | $C_{15}H_{31}COOH$ | 150 | 0.22 | 18 | −8.0 |
| 6 | $C_{15}H_{31}COOH$ | 20 | 0.25 | 10 | −1.0 |
| 7 | $C_{15}H_{31}COOH$ | 20 | 0.23 | 11 | −0.5 |
| 8 | $C_{15}H_{31}COOH$ | 20 | 0.22 | 20 | −4.0 |
| 9 | $C_{15}H_{31}COOH$ | 20 | 0.24 | 25 | −7.0 |
| 10 | $C_{15}H_{31}COOH$ | 3 | 0.45 | 23 | −10 |
| 11* | — | — | 0.55 | 30 | −15 |
| 12** | — | — | 0.35 | 8 | −2.0 |
| 13*** | $C_{15}H_{31}COOH$ | 20 | 0.28 | 28 | −0.5 |

*Control sample without topcoat
**Sample without vapor deposited film
***Sample without plasma-polymerized film

We claim:

1. A magnetic recording medium consisting essentially of a substrate, a ferromagnetic metal thin film formed on the substrate, and a top coat formed on the thin film, characterized in that
   the top coat comprises a plasma-polymerized film consisting essentially of carbon and hydrogen in an atomic ratio of carbon to hydrogen in the range of from 1:1 to 6:1 and having a thickness of from 10 to 30 Å and an organic material film vacuum deposited on the plasma-polymerized film and having a thickness of from 10 to 60 Å.

2. A magnetic recording medium according to claim 1 wherein the ferromagnetic metal thin film is a cobalt base thin film.

3. A magnetic recording medium according to claim 2 wherein the ferromagnetic metal thin film contains oxygen.

4. A magnetic recording medium according to claim 1 wherein the organic material deposited film is comprised of at least one member selected from the group consisting of an aliphatic carboxylic acid, an aliphatic carboxylic acid ester, a phosphoric ester, and a salt of phosphoric ester.

* * * * *